United States Patent

Isomura

[11] Patent Number: 5,150,872
[45] Date of Patent: Sep. 29, 1992

[54] POWER SEAT SLIDE DEVICE

[75] Inventor: Tohru Isomura, Kanagawa, Japan

[73] Assignee: Ikeda Bussan Co., Ltd., Ayase, Japan

[21] Appl. No.: 700,853

[22] Filed: May 16, 1991

[30] Foreign Application Priority Data

May 29, 1990 [JP] Japan ................ 2-56053[U]

[51] Int. Cl.⁵ .............................................. B60N 1/08
[52] U.S. Cl. .................................. 248/429; 248/430;
297/346; 74/425; 74/89.14; 74/89.15
[58] Field of Search ............... 248/429, 430, 419, 424;
74/425, 89.14, 89.15; 297/346

[56] References Cited

U.S. PATENT DOCUMENTS

| | | | |
|---|---|---|---|
| 4,023,433 | 5/1977 | Schutz | 74/425 |
| 4,645,159 | 2/1987 | Terada | 248/429 |
| 4,721,337 | 1/1988 | Tomita | 248/429 X |
| 4,907,776 | 3/1990 | Nemoto | 248/430 |
| 4,949,932 | 8/1990 | Terai | 248/430 |

Primary Examiner—Alvin C. Chin-Shue
Attorney, Agent, or Firm—Foley & Lardner

[57] ABSTRACT

A power seat slide device includes a pair of parallel stationary rails and a pair of parallel movable rails axially slidably engaged with the stationary rails. The movable rail and the stationary rail are assembled to define therebetween an elongate tunnel which extends along a common axis of the stationary and movable rails. A threaded shaft is housed in the elongate tunnel and has both ends rotatably supported by the movable rail. A nut is received in the elongate tunnel and fixed to the stationary rail. The threaded shaft is operatively engaged with the nut so that rotation of the threaded shaft about its axis induces a longitudinal movement of the movable rail relative to the stationary rail. An electric motor is mounted on the movable rail and has a drive shaft. A gear mechanism is arranged between the drive shaft and the threaded shaft for transmitting a power of the drive shaft to the threaded shaft. A gear housing houses therein the gear mechanism. A pair of holders are secured to the movable rail with the gear housing placed therebetween for holding the gear housing.

13 Claims, 2 Drawing Sheets

POWER SEAT SLIDE DEVICE

BACKGROUND OF THE INVENTION

1. Field of the Invention

The present invention relates in general to power seat slide devices, and more particularly to power seat slide devices of a type which includes a threaded shaft that is rotatably supported by a movable rail, and which is driven by an electric motor and a nut that is fixed to a stationary rail and operatively engaged with the threaded shaft.

2. Description of the Prior Art

In order to clarify the task of the present invention, one conventional power seat slide device will be outlined with reference to FIG. 4 of the accompanying drawings.

As is seen from FIG. 4, a pair of parallel stationary rails 10 (only one is shown) are fixed to a vehicular floor (not shown). A pair of parallel movable rails 12 (only one is shown) mount thereon a seat (not shown) and slidably engage with the stationary rails 10. A front portion of an upper wall portion 13 of one movable rail 12 is somewhat raised for the purpose which will be described hereinafter. An elongate tunnel-like space 14 is defined by the engaged stationary and movable rails 10 and 12.

An electric motor (not shown) is mounted on the movable rail 12 and connected to a worm 16 through a drive shaft (not shown) for driving the worm 16. A worm wheel 18 has front and rear cylindrical portions 20 and 22 which extend forwardly and rearwardly therefrom, respectively. The worm wheel 18 has a rectangular through hole (not shown) formed therein which extends from a front end of the front cylindrical portion 20 to a rear end of the rear cylindrical portion 22. The worm 16 is operatively meshed with the worm wheel 18 so that rotation of the worm 16 drives the worm wheel 18. The worm 16 and the worm wheel 18 are housed in a gear housing 24 which is placed under the raised front portion of the upper wall portion 13 of the movable rail 12.

The gear housing 24 has an axially extending through hole 26 for receiving and rotatably supporting the worm wheel 18 and a laterally extending hole (not shown) for receiving and rotatably supporting the worm 16. The gear housing 24 is formed at its upper wall portion with two externally threaded cylindrical projections 30. The gear housing 24 is tightly fixed to the upper wall portion 13 of the movable rail 12 in such a manner that the threaded projections 30 are received in through holes 32 of the movable rail 12 and engaged with nuts 34.

A threaded shaft 28 which extends in and along the tunnel-like space 14, has a thinner front portion. The thinner portion has a rectangular portion 36 and a threaded front portion. The thinner portion of the threaded shaft 28 is received in the rectangular through hole of the worm wheel 18 in such a manner that the rectangular portion 36 of the threaded shaft 28 is fitted in the rectangular through hole of the worm wheel 18 to achieve integral rotation therebetween. A nut 38 is engaged with the threaded front portion of the threaded shaft 28. The threaded shaft 28 is rotatably supported at its rear end (not shown) by the movable rail 12 through a suitable holder (not shown) and operatively engaged with a nut 40 which is fixed to a bottom wall portion 42 of the stationary rail 10.

In the following paragraphs, the operation of the conventional power seat slide device will be described. The description will be commenced with respect to a condition wherein the seat, viz., the movable rail 12 fixed thereto assumes its rearmost position, Under this condition, the electric motor is at its standstill position, and the seat is substantially locked at the rearmost position due to the nature of the meshed engagement between the fixed nut 40 and the threaded shaft 28. That is, under this condition, there is no relative movement between the threaded shaft 28, supported by the movable rail 12, and the nut 40 secured to the stationary rail 10. Even when, by for example a passenger seated on the seat, a certain force is suddenly applied to the threaded shaft 28 in a direction parallel with the axis of the threaded shaft 28, the meshed engagement between the nut 40 and the threaded shaft 28 prevents the threaded shaft 28 from making a movement relative to the fixed nut 40.

When now the motor is energized to rotate in a given direction, the power of the drive shaft of the motor is transmitted through the worm 16 and the worm wheel 18, to the threaded shaft 28, thereby rotating the same about its axis. With this rotation, the threaded shaft 28 advances forward relative to the fixed nut 40, and thus the movable rail 12 carrying the threaded shaft 28 is moved forward relative to the stationary rail 10. This means that the seat is moved forward.

When the seat comes to a desired position, the electric motor is deenergized. With this, the seat is is in a stationary place or is locked at the desired position.

However, the conventional power seat slide device as mentioned hereinabove has the following drawback.

In the case of a heavy head-on collision and the like, the seat together with the movable rail 12, is subject to a remarkable inertial force in a direction to move the seat and movable rail 12 forward relative to the stationary rail 10. Upon this occurrence, the threaded shaft 28, which is connected to the stationary rail 10 through the nut 40, tends to move rearward relative to the gear housing 24 which moves forward together with the movable rail 12. Therefore, mutually opposed movements are produced between the threaded shaft 28 and the gear housing 24. Thus, materials having high strength must be used for the gear case 24 for enduring the load applied thereto by the threaded shaft 28. Thus, the selection of the material to make up the gear case 24 is limited, and it is difficult to use a material such as plastic which is economical and easy to be molded for the gear housing 24.

SUMMARY OF THE INVENTION

Therefore, it is an object of the present invention to provide a power seat slide device, which is free of the above-mentioned drawback.

According to the present invention, materials which do not have high strength, for example, plastic can be used for the gear housing 24.

According to the present invention, there is provided a power seat slide device including a stationary rail, a movable rail axially slidably engaged with the stationary rail, the movable rail and the stationary rail being assembled to define therebetween an elongate tunnel which extends along a common axis of the stationary and movable rails, a threaded shaft housed in the elongate tunnel and having both ends, rotatably supported by the movable rail, a nut received in the elongate tunnel and fixed to the stationary rail, the threaded shaft being operatively engaged with the nut so that rotation of the threaded shaft about its axis induces a longitudinal movement of the movable rail relative to the stationary rail, a drive device mounted on the movable rail, the drive device having a drive shaft, a gear mechanism arranged between the drive shaft and the threaded shaft for transmitting a power of the drive shaft to the threaded shaft, a gear housing for housing therein the gear mechanism and a pair of holders secured to the movable rail, the holders putting the gear housing therebetween.

BRIEF DESCRIPTION OF THE DRAWINGS

Other objects of the present invention will become apparent from the following description when taken in conjunction with the accompanying drawings, in which.

DETAILED DESCRIPTION OF THE INVENTION

Figure 1:
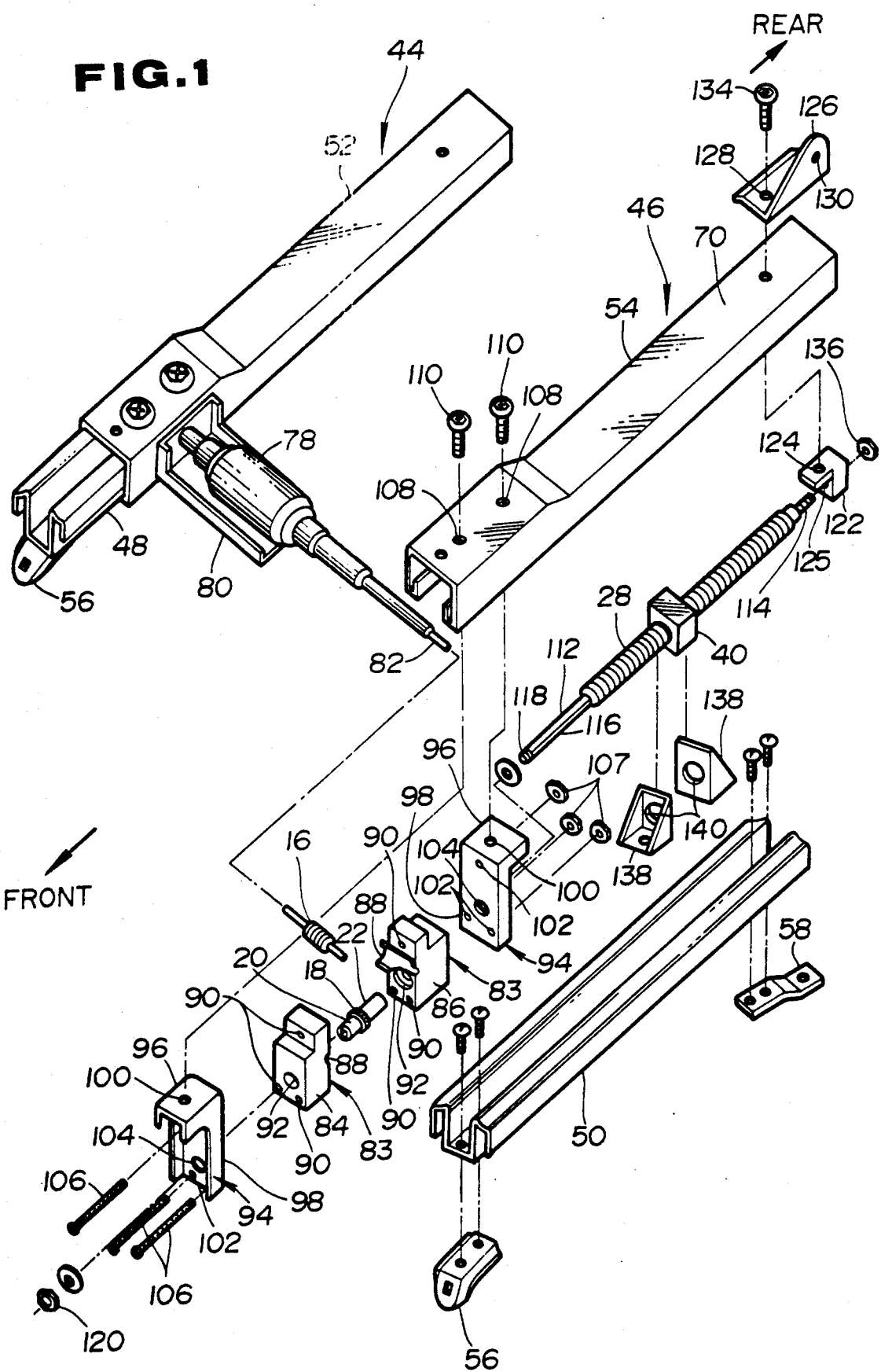
FIG. 1 is an exploded and prespective view of a power seat slide device of the present invention.
Figure 2:
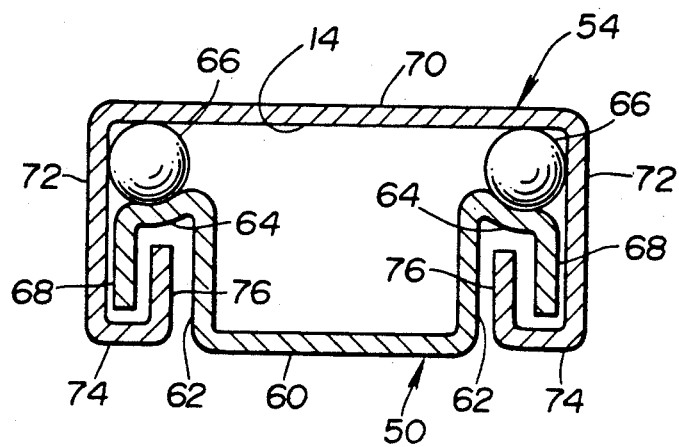
FIG. 2 is a vertically laterally sectional and enlarged view of engaged stationary and movable rails of the power seat slide device of the present invention.
Figure 3:
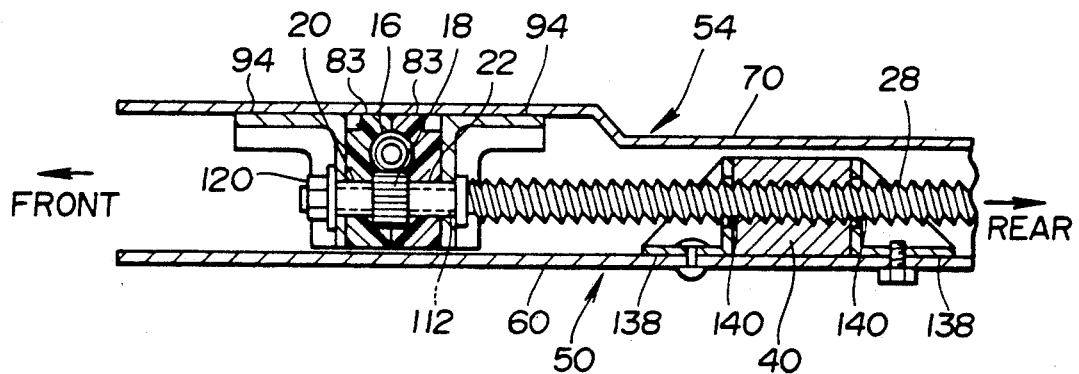
FIG. 3 is a vertically axially sectional and enlarged view of an essential part of the power seat slide device of the present invention.
Figure 4:
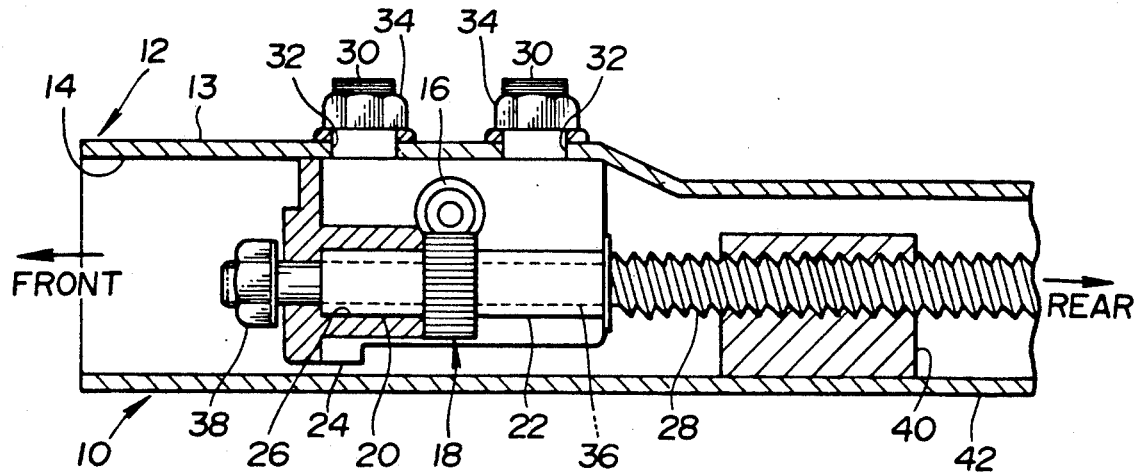
FIG. 4 is a view similar to FIG. 3, but showing a conventional power seat slide device.

Referring to FIGS. 1 to 3, there is shown a power seat slide device according to the present invention.

Since the power seat slide device of the present invention is similar in construction and operation to the above-mentioned conventional power seat slide device, the following description will be directed to only the parts, constructions and operation which are different from those of the conventional power seat slide device. Similar parts and constructions are denoted by the same numerals.

As is seen from FIG. 1, the power seat slide device comprises a pair of right and left parallel rail units 44 and 46, each including a stationary rail 48 or 50, and a movable rail 52 or 54. Each stationary rail 48 or 50 is fixed to a vehicular floor (not shown) through front and rear brackets 56 and 58.

For facilitation of the description, the following explanation of the rail units 44 and 46 will be made only with respect to the left rail unit 46. The parts of the right rail unit 44 are substantially the same in construction and configuration as those of the left rail unit 46.

As is seen from FIG. 2, the stationary rail 50 has a bottom wall portion 60 which is secured to the vehicular floor, inside wall portions 62 which extend vertically upwardly from side ends of the bottom wall portion 60, grooved upper wall portions 64 which extend outwardly from upper ends of the inside wall portions 62 for receiving ball bearings 66 thereon, and outside wall portions 68 which extend vertically downwardly from outer ends of the grooved upper wall portions 64.

The movable rail 54 has an upper wall portion 70 which mounts theron the seat, outside wall portions 72 which extend vertically downwardly from side ends of the upper wall portion 70, bottom wall portions 74 which extend inwardly horizontally from lower ends of the outside wall portions 72, and inside wall portions 76 which extend vertically upwardly from inner ends of the bottom wall portions 74.

The ball bearings 66 are rotatably received in a space which is defined by the upper wall portion 70 and the outside wall portions 72 of the movable rail 54 and the grooved upper wall portions 64 of the stationary rail 50, so that the movable rail 54 is smoothly slidable on and along the stationary rail 50.

An elongate tunnel-like rectangular space 14 is thus defined by and between the engaged stationary and movable rails 50 and 54.

As is seen from FIG. 1, an electric motor 78 is mounted on the movable rail 52 of the right rail unit 44 through an L-shaped bracket 80. The electric motor 78 has a drive shaft 82 passing therethrough, and the drive shaft 82 has a leading end which is secured to a worm 16 which will be described hereinafter.

A gear housing 83 constructed of plastics comprises front and rear half portions 84 and 86. The rear half portion 86 has at its front surface a laterally extending semi-cylindrical groove 88 for rotatably receiving the worm 16, axially extending bolt holes 90 at its upper middle and lower side end portions 90 for receiving bolts, and at a lower middle portion an axially extending through bore 92 for rotatably receiving a rear cylindrical portion 22 of a worm wheel 18. The front half portion 84 of the gear housing 83 is substantially the same in construction as the rear half portion 86. The front and rear half portions 84 and 86 of the gear housing 83 are mated with each other so as to rotatably support the worm 16 and the worm wheel 18 therein. With this configuration, the holes 90 of the front half portion 84 of the gear housing 83 and those of the rear half portion 86 are mated with each other.

A pair of L-shaped holders 94 are used for connecting the gear housing 83 to the movable rail 54. They have respectively horizontal upper wall portions 96 and vertical wall portions 98. Each holder 94 has at its upper wall portion 96 a through hole 100 and a nut (not shown) which is welded to a lower surface of the upper wall portion 96 and mated to the through hole 100, at an upper middle portion and lower side portions of the vertical wall portion 98 bolt holes 102, and at a lower middle portion of the vertical wall portion 98 a through bore 104 for receiving a cylindrical portion 20 or 22 of the worm wheel 18.

The holders 94 are arranged to put therebetween the gear housing 83 in such a manner that the bolt holes 102 and the through bores 104 of the holders 94 are mated with the bolt holes 90 and the through bores 92 of the gear housing 83, respectively. Three bolts 106 are inserted into the bolt holes 90 and 102 of the gear housing 83 and the holders 94, respectively, and are threadedly engaged with nuts 107 so as to fix the gear housing 83 between the holders 94. If desired, a monolithic holder may be employed for holding the gear housing 83.

The through holes 100 of the holders 94 are mated with through holes 108 formed in the movable rail 54. Bolts 110 are inserted into the through holes 108 of the movable rail 54 and the through holes 100 of the holders 94, and threadedly engaged with the welded nuts of the holders 94.

As is seen from FIG. 3, the upper surface of the gear housing 83 and that of the holders 94 are in abutment with a lower surface of a raised upper wall portion 70 of the movable rail 54.

As is seen from FIG. 1, a threaded shaft 28 has front and rear thinner portions 112 and 114. The front thinner portion 112 has a rectangular portion 116, and at its front end a threaded portion 118. The rear thinner portion 114 is threaded. The front thinner portion 112 is received in a rectangular through hole of the worm wheel 18 in such a manner that the rectangular portion 116 of the threaded shaft 28 is fitted in a rectangular through hole of the worm wheel 18 to achieve an integral rotation therebetween. A nut 120 is engaged with the threaded portion 118 of the threaded shaft 28.

An L-shaped shaft holder 122 has at its horizontal and vertical portions through holes 124 and 125, respectively.

A seat belt anchor bracket 126 has at its horizontal portion a through hole 128 and at its vertical portion a through hole 130 for connecting a seat belt anchor (not shown). The bracket 126 and the shaft holder 122 are secured to the upper wall portion 70 of the movable rail 54 by a common bolt 134. The rear thinner portion 114 of the threaded shaft 28 is rotatably received in the through hole 125 of the shaft holder 122 and threadedly engaged with a nut 136.

A nut 40 is generally rectangular in shape and placed on the upper surface of the bottom wall portion 60 of the stationary rail 50. The nut 40 is put between a pair of nut holders 138 which are secured to the bottom wall portion 60 of the stationary rail 50. Therefore, the nut 40 is not movable in a fore-and-aft direction. Rotation of the nut 40 about the threaded shaft 28 is suppressed because side walls of the nut are in abutment with the inside walls 62 of the stationary rail 50. The threaded shaft 28 passes through through holes 140 of the nut holders 138 and operatively engaged with the nut 40.

The advantage of the power seat slide of the present invention will be described in the following paragraph.

The rigidly constructed holders 94 can receive much of the force applied to the gear housing 83 by the threaded shaft 28 in case of head-on collision and the like. Therefore, economical materials such as plastic or the like which do not have high strength can be used for the gear housing 83.

What is claimed is:

1. A power seat slide device comprising:
    a stationary rail;
    a movable rail axially slidably engaged with said stationary rail, said movable rail and said stationary rail being assembled to define therebetween an elongate tunnel which extends along a common axis of said stationary and movable rails;
    a driven threaded shaft housed in said elongate tunnel and having both ends rotatably supported by said movable rail;
    a nut received in said elongate tunnel and fixed to said stationary rail, said driven threaded shaft being operatively engaged with said nut so that rotation of said driven threaded shaft about its axis induces a longitudinal movement of said movable rail relative to said stationary rail;
    a drive device mounted on said movable rail, said drive device having a drive shaft;
    a gear mechanism arranged between said drive shaft and said driven threaded shaft for transmitting a power of said drive shaft to said driven threaded shaft;
    a gear housing for housing therein said gear mechanism; and
    a pair of holders secured to said movable rail, such that said gear housing is disposed between said holders, said holders having means to tightly clamp said gear housing therebetween and such that said gear housing and said holders are aligned along said driven threaded shaft.

2. A power seat slide device as claimed in claim 1, in which said gear housing is made of plastic.

3. A power seat slide device as claimed in claim 2, in which said gear mechanism comprises:
    a worm operatively connected to said drive shaft; and
    a worm wheel operatively meshed with said worm and coaxially secured to said threaded shaft.

4. A power seat slide device as claimed in claim 3, in which said gear housing comprises front and rear half portions which have semi-cylindrical grooves and through bores for receiving and rotatably holding said worm and said worm wheel therein, respectively.

5. A power seat slide device as claimed in claim 4, in which said gear housing and said holders have axially extending bolt holes formed therein, and in which a bolt passes through said bolt holes and threadedly engage with an another nut such that said gear housing is tightly disposed between said holders.

6. A power seat slide device as claimed in claim 5, in which said worm wheel has front and rear cylindrical portions which axially extend therefrom in opposed directions, said worm wheel having a rectangular through hole formed therein which extends from a front end of said front cylindrical portion to a rear end of said rear cylindrical portion, and in which said threaded shaft has a rectangular front portion which fits into said rectangular through hole such that rotation of said worm wheel induces a rotation of said driven threaded shaft about its axis.

7. A power seat slide device as claimed in claim 6, in which said stationary rail comprises:
    a first bottom wall portion;
    first inside wall portions vertically upwardly extending from side ends of said first bottom wall portion;
    grooved upper wall portions outwardly extending from upper ends of said first inside wall portions for receiving ball bearings thereon; and
    first outside wall portions vertically downwardly extending from outer ends of said grooved upper wall portions.

8. A power seat slide device as claimed in claim 7, in which said movable rail comprises:
    an upper wall portion;
    second outside wall portions vertically downwardly extending from side ends of said upper wall portion;
    second bottom wall portions inwardly horizontally extending from lower ends of said second outside wall portions; and
    second inside wall portions vertically upwardly extending from inner ends of said second bottom wall portions.

9. A power seat slide device as claimed in claim 1, in which each of said holders is substantially L-shaped in construction and comprises a horizontal wall portion and a vertical wall portion, said gear housing being tightly sandwiched between said vertical wall portions of said holders, and said horizontal wall portions being secured to said movable rail.

10. A power seat slide device as claimed in claim 1, in which said gear housing has a top surface which is in abutment with said movable rail.

11. A power seat slide device as claimed in claim 8, in which said stationary and movable rails are slidably interlocked through two slidably interlocking structures, each of said interlocking structures comprising one of said second inside wall portions which is disposed between one of said first inside wall portions and one of said first outside wall portions.

12. A power seat slide device as claimed in claim 8, in which said elongate tunnel is defined by said first bottom wall portion, said first inside wall portions, and said upper wall portion.

13. A power seat slide device comprising:
 a stationary rail;
 a movable rail axially slidably engaged with said stationary rail, said movable rail and said stationary rail being assembled to define therebetween an elongate tunnel which extends along a common axis of said stationary and movable rails;
 a threaded shaft housed in said elongate tunnel and having both ends rotatably supported by one of said stationary and movable rails;
 a nut received in said elongate tunnel and fixed to the other of said stationary and movable rails, said threaded shaft being operatively engaged with said nut so that rotation of said threaded shaft about its axis induces a longitudinal movement of said movable rail relative to said stationary rail;
 a drive device mounted on the rail by which said threaded shaft is supported, said drive device having a drive shaft;
 a gear mechanism arranged between said drive shaft and said threaded shaft for transmitting a power of said drive shaft to said threaded shaft;
 a gear housing for housing therein said gear mechanism; and
 a holder being secured to the rail by which said threaded shaft is supported, said holder having means to tightly clamp said gear housing, said holder and said gear housing being aligned along the common axis of said stationary and movable rails.

* * * * *

UNITED STATES PATENT AND TRADEMARK OFFICE
CERTIFICATE OF CORRECTION

PATENT NO. :    5,150,872
DATED      :    September 29, 1992
INVENTOR(S) :   Tohru ISOMURA It is certified that error appears in the above-identified patent and that said Letters Patent is hereby corrected as shown below:

On the title page Item No. [30] should read -- 2-56053[U]-- instead of unclear typing of number.

Signed and Sealed this

Twelfth Day of October, 1993

Attest:

BRUCE LEHMAN

Attesting Officer                Commissioner of Patents and Trademarks